2-CARBOALKOXY-4-CYANO-1-BUTENE PRODUCTION

James D. McClure, San Francisco, Calif., assignor to Shell Oil Company, New York, N.Y., a corporation of Delaware
No Drawing. Filed May 13, 1963, Ser. No. 280,125
4 Claims. (Cl. 260—465.4)

This invention relates to a class of novel compounds and to the method of their production. More particularly, it relates to a novel process for the production of 2-carboalkoxy-4-cyano-1-butene and the novel compounds produced thereby.

The ability of acrylate esters and related materials to undergo polymerization and co-polymerization reactions is well recognized in the art. Such materials are so readily polymerizable that great difficulty is attendant to processes for the production of dimers of these materials, wherein the formation of polymer must be minimized. Such processes generally require low temperatures and carefully controlled reaction conditions, and yet generally produce low yields of dimer product. For example, U.S. Patent No. 3,074,999 to Rauhut et al., describes the production of 2-methyleneglutarate esters in yields of about 50% from the dimerization of acrylate ester.

Even greater difficulty is reasonably anticipated when attempts are made to prepare a co-dimer from an acrylate ester and a closely related material, e.g., acrylonitrile. By co-dimer, also referred to as cross-dimer, is meant a dimeric product containing one molecule of acrylate ester and one molecule of the related compound, and the process for the production thereof is referred to as a cross-dimerization or co-dimerization process. When ethyl acrylate and acrylonitrile are co-dimerized, for example, in addition to two homopolymers and a co-polymer, at least four dimeric products are possible, e.g., the acrylate ester dimer, the acrylonitrile dimer, a substituted butene wherein the olefinic linkage is conjugated with the carboalkoxy group, and a substituted butene wherein the ethylenic linkage is conjugated with the nitrile function. In addition, isomers of each of these dimer structures are possible.

It is an object of the invention to provide a novel class of compounds and the novel method for the production thereof. More specifically, an object is to provide a class of 2-carboalkoxy-4-cyano-1-butenes and a method for their production.

These objects are accomplished in the process of the invention by co-dimerizing acrylate ester and a 1-cyano-1-alkene in liquid-phase solution and in the presence of a phosphine catalyst. Surprisingly, it has been found that under suitable reaction conditions, and in the presence of a suitable catalyst, cross- or co-dimer is produced as the major product, and the cross-dimer produced comprises essentially a single product.

The acrylate ester reactant of the process of the invention is the ester of acrylic acid and a monohydroxylic alcohol represented by the formula $CH_2=CH-COOR''$ wherein $R''$ is the moiety of a monohydroxylic alcohol. Preferred esters are those containing alcohol moieties of saturated acyclic aliphatic alcohols having from 1 to 8 carbon atoms. Although the process of the invention is operable with acrylate esters of secondary and tertiary alcohols, best results are obtained when the alcohol moiety of the acrylate ester is that of a primary, straight chain alkanol. Illustrative of such preferred acrylate ester reactants are methyl acrylate, ethyl acrylate, n-propyl acrylate, n-butyl acrylate, n-hexyl acrylate, n-octyl acrylate, and the like. Most useful for the ease of their production and the value of products obtained therefrom are acrylate esters of alkanols having from 1 to 2 carbon atoms, that is, ethyl acrylate and methyl acrylate.

The acrylate ester is co-dimerized with a 1-cyano-1-alkene. The utilization of acrylonitrile is most desirable from both process and product considerations, and the use of acrylonitrile as the reactant to be cross-dimerized with acrylate ester is preferred.

The acrylate ester and acrylonitrile are employed in substantially stoichiometric amounts. Although an excess of either reactant does not appear to be detrimental, little is gained by employing a substantial excess of either. Molar ratios of ester to nitrile from about 2:1 to about 1:2 are generally satisfactory, while a ratio substantially 1:1 gives good results in most cases.

The cross-dimerization process is conducted in liquid-phase solution. Solvents that are suitable in the process of the invention are liquid at reaction temperature and pressure, and are substantially inert with respect to solvent addition across the ethylenic linkage of the unsaturated reactants. Thus, suitable solvents include the hydrocarbons, both aliphatic and aromatic, e.g., hexane, isooctane, Decalin, benzene and toluene; and oxygen-containing solvents including ethers, especially cyclic ethers, such as dioxane and tetrahydrofuran, lower esters such as ethyl acetate and methyl butyrate, and lower alkyl sulfoxides such as dimethyl sulfoxide.

Preferred solvents, however, are the alcohols, particularly aliphatic saturated monohydroxylic alcohols, including ether-alcohols, containing from 1 to 10 carbon atoms. The role of the solvent in the reaction process is not clearly understood. Without wishing to be bound by any particular theory, it is believed that alcoholic solvents, in addition to serving as a reaction diluent, participate in the cross-condensation process by supplying hydrogen ions which serve to minimize the production and propagation of reactant chains which result in the formation of polymeric product. The use of hydroxylic solvents enables the condensation process to be conducted at temperatures higher than when other solvents are employed, and yet retain selectivity for dimerization and retard the greater tendency for polymerization normally associated with reaction of polymerizable materials at elevated temperatures. When hydroxylic solvents are employed the advantages gained by the use of the higher reaction temperatures are manifested in more rapid rates of reaction and consequent shorter reaction times. However, primary alcohols, and to a lesser extent secondary alcohols, have a tendency to add to the olefinic linkage of the unsaturated reactants, and although primary and secondary alcohols may be employed as reaction solvents, the solvent addition reduces the yield of desired products. Best results are obtained when the alcoholic solvent is a tertiary alkanol, which alkanols appear to be sufficiently active to effectively minimize polymerization but exhibit little tendency to add to the olefinic linkage of the acrylic reactants. Suitable tertiary alkanol solvents are tert-butyl alcohol, tert-amyl alcohol, methyl diethyl carbinol, triethyl carbinol and the like. Most preferred as solvent for the process of the invention is tert-butyl alcohol.

The solvent is employed in equivalent amount or in molar excess over the reactants. Ratios of moles of solvent to total moles of reactant from about 1:1 to about 10:1 are satisfactory, with ratios of from about 1:1 to about 5:1 being preferred.

The cross-condensation process is conducted in the presence of a tertiary phosphine catalyst. Suitable tertiary phosphine catalysts preferably have a total of from 3 to 60 carbon atoms in the organic moieties and include compounds represented by the formula RRRP wherein each R is alkyl or aralkyl, preferably having up to 12 carbon atoms, and aryl or alkaryl, preferably having up to 10 carbon atoms, as well as tertiary diphosphines represented by the formula RRP—R'—PRR wherein R has the previously stated significance and R' is a divalent radical corresponding to R. Largely for economic reasons, preferred tertiary phosphine catalysts are those wherein each R group is unsubstituted hydrocarbyl, as illustrated by alkyl and aralkyl R groups such as methyl, ethyl-n-butyl, sec-butyl, tert-amyl, hexyl, decyl, lauryl, benzyl and β-phenylethyl radicals; and aryl and alkaryl R groups including phenyl, tolyl, xylyl, naphthyl and p-tert-butyl-phenyl radicals. Exemplary tertiary phosphine catalysts containing these preferred hydrocarbyl substituents are triethylphosphine, trimethylphosphine, tri-n-butylphosphine, dimethylphenylphosphine, dipropylhexylphosphine, methylhexyloctylphosphine, p-tolyldiphenylphosphine, 3-(dipropylphosphino)propyldipropylphosphine, 2-(dibenzylphosphino)ethyldibutylphosphine, and the like.

However, some tertiary phosphines are available wherein the groups attached to the phosphorus atom are substituted hydrocarbyl and such phosphines are suitable catalysts in the process of the invention. Illustrative of catalysts containing substituted hydrocarbyl substituents are those tertiary phosphines containing cyanoalkyl substituents, e.g., tri(2-cyanoethyl)phosphine, (2-cyanoethyl)di-n-butylphosphine, (2-cyanopropyl)dimethylphosphine, and di(2-cyanoethyl)octylphosphine: tertiary phosphines containing carboalkoxyalkyl substituents such as (2-carbethoxyethyl)diethylphosphine, (2-carbomethoxyethyl)diphenylphosphine, and di(4-carbopropoxybutyl)laurylphosphine; tertiary phosphines containing dialkylaminohydrocarbyl substituents including (2-dimethylaminoethyl)diethylphosphine, tri(3-diethylaminopropyl)phosphine, and di(2-dimethylaminoethyl)butylphosphine, tri(p-dimethylaminophenyl)phosphine, di(p-diethylaminophenyl)phenylphosphine; and tertiary phosphines containing alkoxyaryl substituents such as tri(p-methoxyphenyl)phosphine and di(p-butoxyphenyl)butylphosphine.

Also suitable are catalysts wherein the tertiary phosphine moiety is a ligand within a metallic complex, such as modified carbonyl complexes of cobalt and other transition metals of Group VIII of the Periodic Table, e.g., bis(tri-n-butylphosphine) dicobalt hexacarbonyl, bis(triphenylphosphine) dicobalt hexacarbonyl, [2-(diethylphosphino)ethyldiethylphosphine] dicobalt hexacarbonyl, and the like.

The tertiary phosphine is employed in catalytic amounts. Catalyst concentrations from about 0.0001 to about 0.1 mole of catalyst per mole of reactant are in general satisfactory, although concentrations from about 0.001 to about 0.01 mole of catalyst per mole of reactant are preferred.

The cross-condensation is preferably conducted under substantially anhydrous conditions, as water is reactive toward the materials to be cross-dimerized. Small amounts of water, up to about 1% may be tolerated, but the yield of desired product is lowered. The condensation is customarily conducted in an inert atmosphere, e.g., under an inert gas such as nitrogen, argon, helium, and the like. The reactants are charged to an autoclave, or similar reactor, which is sealed and heated to reaction temperature. Suitable reaction temperatures range from about 50° C. to about 190° C. with temperatures from about 75° C. to about 150° C. being preferred, and temperatures from about 100° C. to about 130° C. being most satisfactory. The process may be conducted at atmospheric or superatmospheric pressure. A convenient pressure is that generated by the reactants when heated to the reaction temperature. Such pressures will be somewhat but not greatly higher than atmospheric pressure. Reaction times vary from about 1 to about 15 hours. When reaction is complete, the reactor is cooled and opened, and the product recovered from the reaction mixture by conventional means, as by fractional distillation subsequent to removal of solvent and unreacted starting material, which may then be recharged to the reactor for further reaction. Best results are obtained when the catalyst is deactivated, as by neutralization with an acid, e.g., acetic acid, prior to distillation of the reaction mixture.

The product contains a mixture of dimers. In a typical dimerization, approximately equivalent amounts of acrylonitrile dimer, 2-methyleneglutaronitrile, and alkyl acrylate dimer, dialkyl 2-methyleneglutarate, are produced. Surprisingly, however, the product of cross-dimerization, which is the major product, essentially comprises a single compound. Although by analogy with the homodimer products, a mixture of 2-carbethoxy-4-cyano-1-butene and 4-carbethoxy-2-cyano-1-butene is reasonably expected from cross-dimerization of ethylacrylate and acrylonitrile, such a mixture of cross-dimerization products is not obtained. In contrast, in a typical condensation of acrylonitrile and ethyl acrylate, essentially all of the co-dimer product is 2-carbethoxy-4-cyano-1-butene, the non-homodimeric dimer product wherein the methylene group is conjugated with the carbethoxy group, and no isolable amount of the isomeric 4-carbethoxy-2-cyano-1-butene is obtained. Illustrative of the novel cross-dimer products of the invention are 2-carbomethoxy-4-cyano-1-butene, 2-carbethoxy-4-cyano-1-butene, 2-carbobutoxy-4-cyano-1-butene, 2-carbohexoxy-4-cyano-1-butene and 4-carbooctoxy-2-cyano-1-butene.

The novel products of the invention find utility as chemical intermediates. As they are β-cyanoethyl derivatives of an acrylate ester, the compounds may be polymerized through the active methylene group to form polyacrylates with nitriloalkyl substituents. Alternatively, the novel compounds may be reacted with other acrylate esters to form useful co-polymers. As the methylene group is activated by conjugation with the ester group, hydrogen cyanide may be added to the olefinic linkage to form the 3-carboalkoxy-adiponitrile, which in turn may be hydrolyzed to the corresponding tricarboxylic acid. The ethylenic linkage may be epoxidized under basic conditions, as by treatment with a basic solution of hypohalite, to form the epoxy diacid, 4-carboxy-4,5-epoxyvaleric acid, or epoxidized under acidic conditions as by reaction with a peracid, to the 4-carboxy-4,5-epoxyvaleramide. The resulting epoxy compounds are utilized in the production of epoxy resins by reaction with a variety of conventional curing agents. The 2-carboalkoxy-4-cyano-1-butene is hydrolyzed to the free acid and reduced to the carboxyamine, which may be cyclyzed to the lactam or used as a monomer in the production of polyamides. In addition, of course, the 2-carboalkoxy-4-cyano-1-butene may be hydrolyzed to 2-methyleneglutaric acid or the corresponding carboxy amide.

To illustrate the novel process of the invention and the novel products obtained therefrom, the following examples are provided. It should be understood that they are not to be regarded as limitations, as the teachings thereof may be varied as will be understood by one skilled in this art.

*Example I*

A solution of 15 g. (0.3 mol) acrylonitrile, 30 g. (0.3 mol) of ethyl acrylate, 0.05 g. of hydroquinone and 0.5 g. of tri-n-butylphosphine in 100 ml. of tert-butyl alcohol were sealed in a glass-lined reactor under nitrogen and heated to and maintained at 102±2° C. for 8 hours. The reactor was cooled and opened and the solvent and unreacted starting materials removed by distillation under reduced pressure after neutralization with 0.15 g. acetic acid. Distillation of the residue yielded 4 g. of product, B.P. 70/80° C. at 0.2 mm., which represented a 75% yield of dimeric product based upon converted starting material. Analysis by gas-liquid chromatography disclosed the product to be composed of 18% 2-methyleneglutaronitrile, 17% diethyl 2-methyleneglutarate and 65% 2-carbethoxy-4-cyano-1-butene.

Example II

To a glass-lined reactor were charged 90 g. (1.7 mols) of acrylonitrile, 180 g. (1.8 mols) of ethyl acrylate, 3 g. of tri-n-butylphosphine and 600 ml. of tertiary butyl alcohol under nitrogen. The reactor was sealed and maintained at 105±10° C. for 7.5 hours, then cooled and opened and the reaction mixture was neutralized with 1 g. of acetic acid. Subsequent to removal of solvent and unreacted starting material, distillation of the residue gave 23 g. of product, B.P. 67-72° C. at 0.2 mm. Analysis indicated the composition of the product to be 20% 2-methyleneglutaronitrile, 18% diethyl 2-methyleneglutarate, and 62% 2-carbethoxy-4-cyano-1-butene.

Example III

A solution of 20 g. (0.37 mol) of acrylonitrile, 40 g. (0.47 mol) of methyl acrylate, 0.05 g. of hydroquinone and 1 g. of tri-n-butylphosphine in 100 ml. of tertiary butyl alcohol was sealed under nitrogen in a glass-lined reactor. The reaction mixture was heated to 112±3° C. and maintained at that temperature for 7.5 hours. The reactor was then cooled and opened, and the contents neutralized with acetic acid. Unreacted starting material and solvent were removed and the residue fractionally distilled to give, interalia, 7.5 g. of dimeric product, B.P. 70-75° C. at 0.5 mm., which represented a yield of about 75% based upon converted starting material. The composition of the product was 5% 2-methyleneglutaronitrile, 32% dimethyl 2-methyleneglutarate, and 63% 2-carbomethoxy-4-cyano-1-butene.

Example IV

A solution of 20 g. acrylonitrile, 40 g. of ethyl acrylate, 0.05 g. of hydroquinone and 1.0 g. of tri-n-butylphosphine in 100 g. of tertiary butyl alcohol was maintained at 105±2° C. for 7.5 hours under nitrogen in a glass-lined reactor. The reactor was cooled and opened and the reaction mixture was neutralized with 0.3 g. of acetic acid. The solvent and unreacted starting material was removed by distillation under reduced pressure. Fractional distillation of the product mixture afforded 9 g., B.P. 70-80° C. at 0.5 mm., of dimer product, which analysis showed to be 16% 2-methyleneglutaronitrile, 19% diethyl 2-methyleneglutarate and 65% 2-carbethoxy-4-cyano-1-butene. The yield of 2-carbethoxy-4-cyano-1-butene was 45% based upon a 22% conversion.

Example V

When acrylonitrile and n-hexyl acrylate are reacted in tert-amyl alcohol solution in the presence of trihexylphosphine, good yields of 2-carbohexoxy-4-cyano-1-butene are obtained.

Example VI

When n-propyl acrylate is reacted with acrylonitrile according to the procedure of Example III except that 2 - (diphenylphosphinoethyl)diphenylphosphine is employed as catalyst, good yields of 2-carbopropoxy-4-cyano-1-butene are obtained.

Example VII

Good yields of 2-carbethoxy-1-cyano-1-butene are obtained when ethyl acrylate and acrylonitrile are reacted in dioxane solution in the presence of triethylphosphine catalyst.

I claim as my invention:

1. The process for the production of 2-carboalkoxy-4-cyano-1-butene by reacting acrylonitrile and alkyl acrylate of the formula $$CH_2=CH-COOR''$$

wherein R'' is alkyl of from 1 to 8 carbon atoms, the molar ratio of the acrylate to acrylonitrile being from about 2:1 to about 1:2, under substantially anhydrous conditions in the presence of from about 0.0001 mole to about 0.1 mole per mole of reactant of tertiary phosphine catalyst selected from the group consisting of RRRP and RRP—R'—PRR wherein R is selected from the group consisting of alkyl of up to 12 carbon atoms, aralkyl of up to 12 carbon atoms, aryl of up to 10 carbon atoms and alkaryl of up to 10 carbon atoms, and R' is a divalent radical corresponding to R, in solution in tertiary alkanol of from 4 to 10 carbon atoms, at a temperature from about 50° C. to about 190° C.

2. The process of claim 1 wherein the alkyl acrylate is ethyl acrylate.

3. The process of claim 1 wherein the tertiary phosphine catalyst is trialkylphosphine wherein the alkyls independently are alkyl of up to 12 carbon atoms.

4. The process for the production of 2-carbethoxy-4-cyano-1-butene by reacting acrylonitrile and ethyl acrylate, the molar ratio of said acrylate to acrylonitrile being from about 2:1 to about 1:2, under substantially anhydrous conditions in tertiary butyl alcohol solution in the presence of from about 0.0001 mole to about 0.1 mole per mole of reactant of tri-n-butylphosphine catalyst, at a temperature from about 50° C. to about 190° C.

References Cited by the Examiner

UNITED STATES PATENTS 2,391,251  12/1945  Long.
3,074,999  1/1963  Rauhut et al. _____ 260—485

CHARLES B. PARKER, *Primary Examiner.*